TAPE DISPENSER

Filed Feb. 27, 1961 8 Sheets-Sheet 1

INVENTOR
Herbert C. Eisenman
BY
Spencer, Rockwell & Bartholow
ATTORNEY

April 20, 1965 H. C. EISENMAN 3,178,978

TAPE DISPENSER

Filed Feb. 27, 1961 8 Sheets-Sheet 2

INVENTOR

Herbert C. Eisenman

BY

Spencer, Rockwell & Bartholow

ATTORNEY

April 20, 1965 H. C. EISENMAN 3,178,978

TAPE DISPENSER

Filed Feb. 27, 1961 8 Sheets-Sheet 3

INVENTOR

Herbert C. Eisenman

BY

Spencer, Rockwell & Bartholow

ATTORNEY

INVENTOR

Herbert C. Eisenman

BY

Spencer, Rockwell & Bartholow
ATTORNEY

April 20, 1965 H. C. EISENMAN 3,178,978

TAPE DISPENSER

Filed Feb. 27, 1961 8 Sheets-Sheet 5

INVENTOR

Herbert C. Eisenman

BY

Spencer, Rockwell & Bartholow

ATTORNEY

April 20, 1965 H. C. EISENMAN 3,178,978

TAPE DISPENSER

Filed Feb. 27, 1961 8 Sheets-Sheet 6

INVENTOR

Herbert C. Eisenman

BY

Spencer, Rockwell & Bartholow

ATTORNEY

INVENTOR
Herbert C. Eisenman
BY
Spencer, Rockwell & Bartholow
ATTORNEYS

INVENTOR
Herbert C. Eisenman
BY
Spencer, Rockwell & Bartholow
ATTORNEY

United States Patent Office 3,178,978

Patented Apr. 20, 1965

3,178,978

TAPE DISPENSER

Herbert C. Eisenman, Trumbull, Conn., assignor to Minnesota Mining and Manufacturing Company, St. Paul, Minn., a corporation of Delaware Filed Feb. 27, 1961, Ser. No. 91,821

4 Claims. (Cl. 83—208)

This invention relates to tape-dispensing apparatus and more particularly to electrically operated devices for dispensing strips of tape and severing the strips at a desired point so that a measured length of tape will be delivered from the machines.

In tape-dispensing machines of this character it is desired that the device be capable of serving a measured length of tape. However, it is also desirable that the length of tape delivered may be measured or determined by the operator so that a strip of any desired length may be obtained even though the device may not be set for a strip of this length, that is to say, that while strips of one or more measured lengths may be automatically delivered by the machine, a strip of a random length may also be obtained at the desire of the user.

It is true that in many instances it is desirable not only to deliver one strip of a given length but it is advantageous that the machine be capable of delivering a number of strips at the will of the operator, which result may be accomplished merely by pressing the proper button, for example, which will actuate the proper controls to set the machine in motion, stop the feed when a given length has been delivered, sever the tape, and reset the mechanism for a subsequent operation.

In the present instance these functions are performed electrically as will be hereinafter explained. In accordance with one of the structures shown in the drawings in which the invention is embodied, a feed roll in contact with the tape is driven electrically and a presser roll is movably mounted so that it may be swung into engagement with the tape on the feed roll to effect feeding of the tape by the latter. Conveniently this presser roll is mounted on a swinging frame which also carries the severing knife and electrical mechanism, herein shown as solenoids, one to effect swinging of this frame in one direction to effect engagement of the presser roll with the tape and another to swing the frame in the other direction to break this connection and stop the feed and at the same time move the severing knife across the tape path to sever the tape.

Also means are provided which rotate by engagement with the tape itself to control the length of the delivered strip when a definite length is desired. The measuring roller which rotates by engagement with one surface of the tape is employed to rotate a plurality of cam disks an amount proportional to the length of the fed strip desired so that the arc through which any one of the cam disks is rotated will bear a direct relation to the length of the fed strip. In turn each of the cam disks serves to control the solenoids which actuate the frame carrying the presser roll and knife so that at a given point in the operation the feed will be stopped and the tape severed.

In addition the device may be provided with visual means for measuring the length of the delivered strip. That is to say, the operator may manually close a switch which will start the device in operation and maintain the switch in closed position until the desired length has been delivered as determined from the visual measuring means, whereupon release of the switch will stop the tape feed. The operator may also, of course, by pressing a button feed a random length, in which case he may merely estimate the length of the delivered strip and release the button when sufficient tape has been fed.

One object of the present invention is to provide a new and improved electrically operated tape-dispensing apparatus which will automatically deliver and sever tape strips of a number of predetermined lengths.

A further object of the invention is to provide a new and improved tape-dispensing mechanism which will automatically deliver a number of predetermined lengths of tape but which may also be employed to deliver a strip of random length when that is desired.

Still another object of the invention is to provide a new and improved electrically operated tape-dispensing mechanism of the character described which will operate smoothly and accurately in that the measured length of tape strips will not vary from that for which the device is set and wherein any desired adjustment of the measured lengths may be effected.

Another object of the invention is to provide a new and improved electrically operated tape-dispensing apparatus of the character described wherein the mechanism for measuring the delivered strips includes a roller in contact with the tape strip and driven by the movement of the strip itself rather than by the feeding mechanism.

To these and other ends the invention consists in the novel features and combinations of parts to be hereinafter described and claimed.

Figure 1:
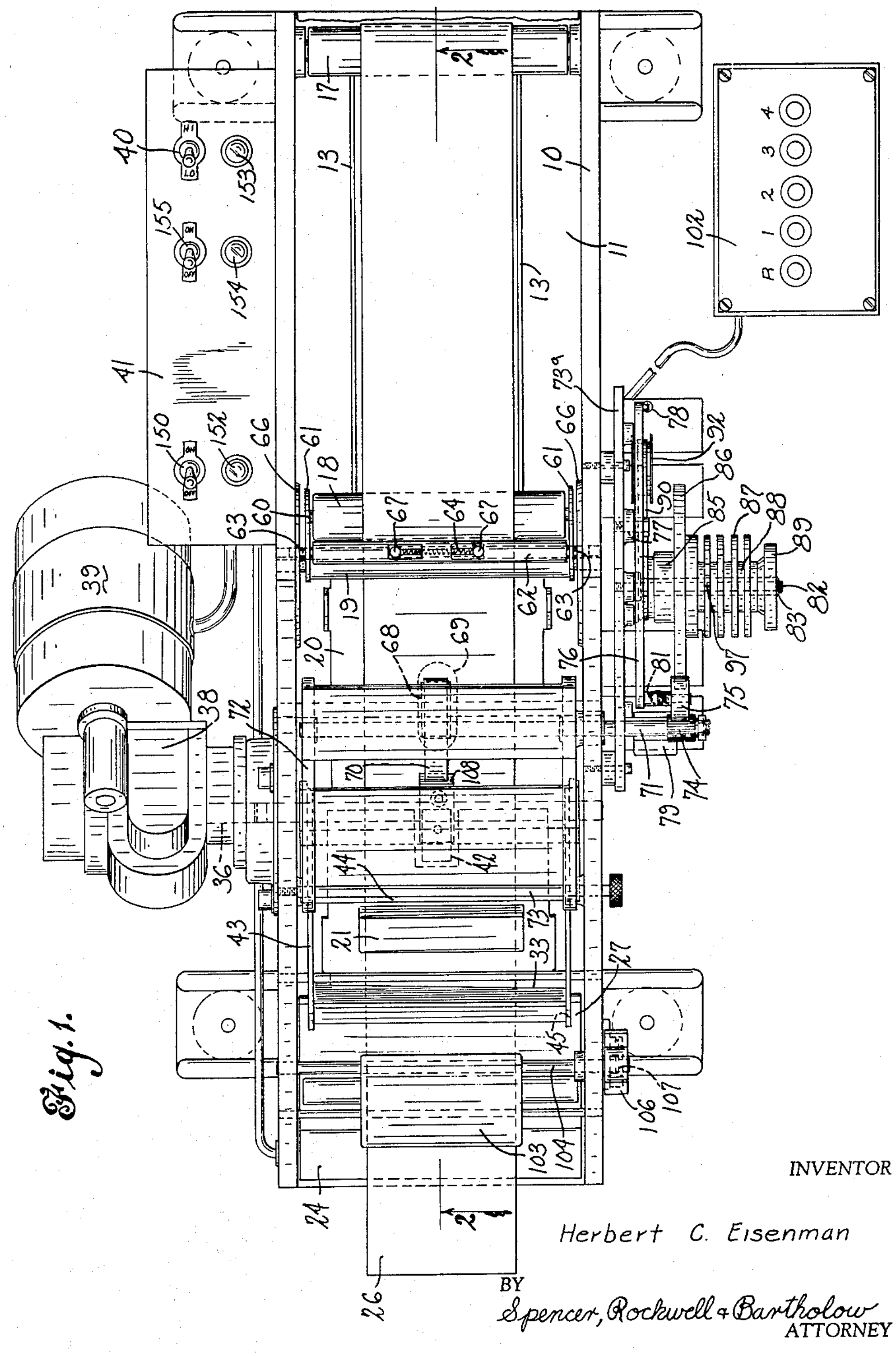
FIG. 1 is a top plan view of a tape-dispensing apparatus embodying the invention, the cover being removed to show the interior mechanism.

To illustrate one embodiment of the invention there is shown in the drawings a casing or main frame 10 having at the rear thereof a well 11 within which may be mounted the supply roll 12 of tape which is to be dispensed. The supply roll may be positioned laterally of the device by tape guides 13, one on each side of the supply roll 12, these tape guides being slidably supported upon transverse rods 14 and 15 so that they may be moved laterally in accordance with the width of the tape being dispensed and frictionally held in place by the spring 16.

In this embodiment illustrated only by way of example, the tape issuing from the supply roll 12 is brought around a guide roll 17 and passes between tensioning rollers 18 and 19 to pass over the surface of a table or plate 20 and below a weight or guide member 21.

In the event that the tape is of the gummed type, it will normally be delivered over the surface of a moistening element such as the brush 23 mounted in a receptacle 24 of water, and in this receptacle may be mounted an electrical heating element 25 so as to maintain the temperature of the water at the desired point. The protruding end of the tape, as shown at 26, passes between the brush or brushes 23 and a presser element 27 which maintains the tape against the upper edge of the brushes and insures its proper moistening.

Adjacent the forward end of the table or plate 20 is a shear plate 28 extending transversely across the tape path, this member being mounted upon a U-shaped frame 29 pivoted at 30 to the casing. A spring 31 secured to the lower end of a leg of the frame 29 and secured at its other end as at 32 to the casing urges the shear element 28 forwardly or toward the plane of the moving severing knife 33 which will be referred to hereinafter.

The feeding mechanism comprises a feed roll 35 mounted upon a shaft 36, the upper surface of the roll projecting upwardly through an opening 37 in the table 20 so as to engage the lower surface of the tape strip. The shaft 36 extends through the casing into a gear box 38 (FIG. 1) which encloses reduction gearing (not shown) driven from the shaft of the motor 39 secured to the wall of the casing, the motor speed being controlled by the switch 40 mounted upon a control box 41 secured to the wall of the casing so that whenever the motor is in operation the feed roll 35 will be rotated.

While the feed roll 35 is in contact with the lower surface of the tape, the latter will not be fed or delivered unless the tape is pressed against this roll by a presser roll 42 rotatably mounted in a swinging frame 43 pivoted upon a rod 44 mounted upon the walls of the casing. Pivoted to this swinging frame at 45 is the severing knife 33 so that when the frame 43 is in the feeding position, shown in FIG. 2, the presser roll 42 will press the tape against the feed roll 35, and rotation of the latter will effect feeding of the tape with the knife 33 being in raised position so that it clears the tape path. However, when the swinging frame 43 is moved in a counterclockwise direction to the position shown in FIG. 4, the presser roll 42 will be raised from contact with the tape, thus cutting off the feed and the severing member 33 moved downwardly across the edge of the shear plate 28 to sever the dispensed strip.

Figures 2, 3, 4:
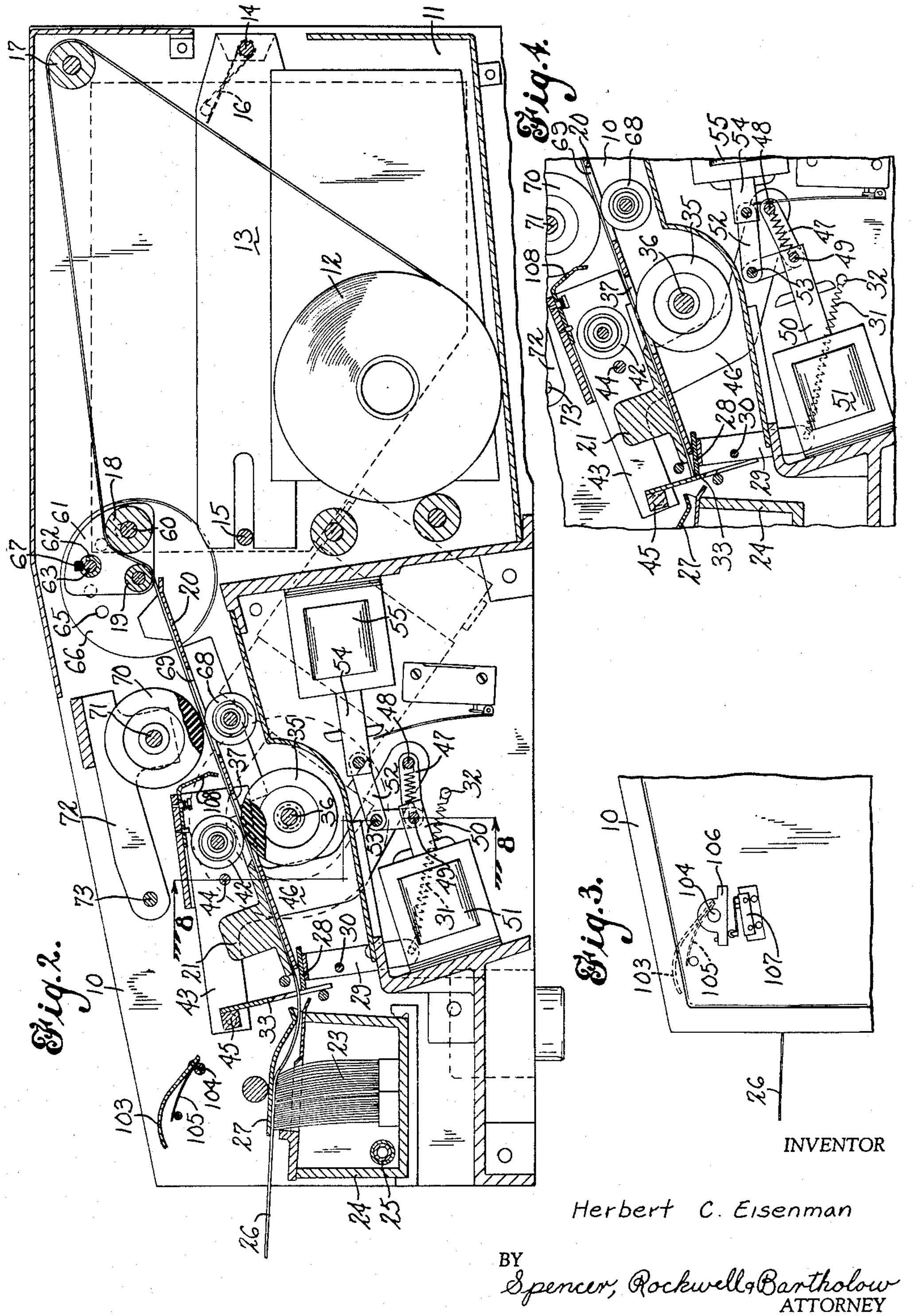
FIG. 2 is a sectional view on line 2—2 of FIG. 1 showing the parts in the position occupied during feeding of the tape.
FIG. 3 is a fragmentary side elevational view of a portion of the front of the mechanism.
FIG. 4 is a fragmentary sectional view similar to FIG. 2 but showing the feed rolls and adjacent mechanism in the position occupied during the severing of the tape.

An arm 46 is secured to the swinging frame 42 and extends downwardly and rearwardly, as shown in FIGS. 2 and 4. A link 47 pivoted to this arm at 48 is pivoted at 49 to the armature 50 of a solenoid 51 mounted on the frame. Energization of the solenoid draws the armature 50 toward the left and swings the frame 43 in a clockwise direction about its pivot 44 to engage the presser roller with the tape.

Similarly a link 52 pivoted at 53 to the arm 46 is pivoted to the armature 54 of a solenoid 55 so that when this solenoid is energized, the swinging frame 43 is swung in a counterclockwise direction, moving the parts to the position shown in FIG. 4, thus terminating the feeding operation and effecting the tape severance.

The tension roller 18 is mounted by a shaft 60 carried by plates 61 rotatably mounted upon the shaft of the roller 19 at the opposite ends of this shaft. The two plates are conected by a tubular member 62 within which are a pair of rods 63 projecting from opposite ends of the tube 62 and urged outwardly by the spring 64. The ends of these rods are adapted to project into openings 65 provided in disks 66 on the walls of the casing and hold the plates 61 in adjusted positions as a number of the openings 65 are provided. The rods 63 are provided with manually engageable members 67 so that they may be withdrawn inwardly to move the plates 61 to adjusted positions. This will adjust the position of the roller 18 with respect to the roller 19 to apply various degrees of tension to the tape.

Also rotatably supported below the table 20 is a roller 68 adapted to engage the tape through the opening 69 in the table and a measuring roller 70 is adapted to contact the upper surface of the tape above the roller 68. The measuring roller 70 is secured to a shaft 71 carried by a U-shaped frame 72 pivoted at 73 to the sides of the casing and resting by its weight upon the upper side of the tape so as to be driven thereby when the tape is fed.

The shaft 71 of this roller extends through the main frame and through a plate 73ª secured on the side of the frame, and is provided on its extended end (FIG. 1) with a knurled end 74 which serves to drive the measuring mechanism. Adapted to cooperate with the driving member 74 is a friction roller 75 mounted upon an arm 76 (FIG. 5) adjustably pivoted at 77 to the plate at the outside thereof and normally held in the position shown in FIG. 5 by a relatively light spring 78.

Figures 5, 6, 7:
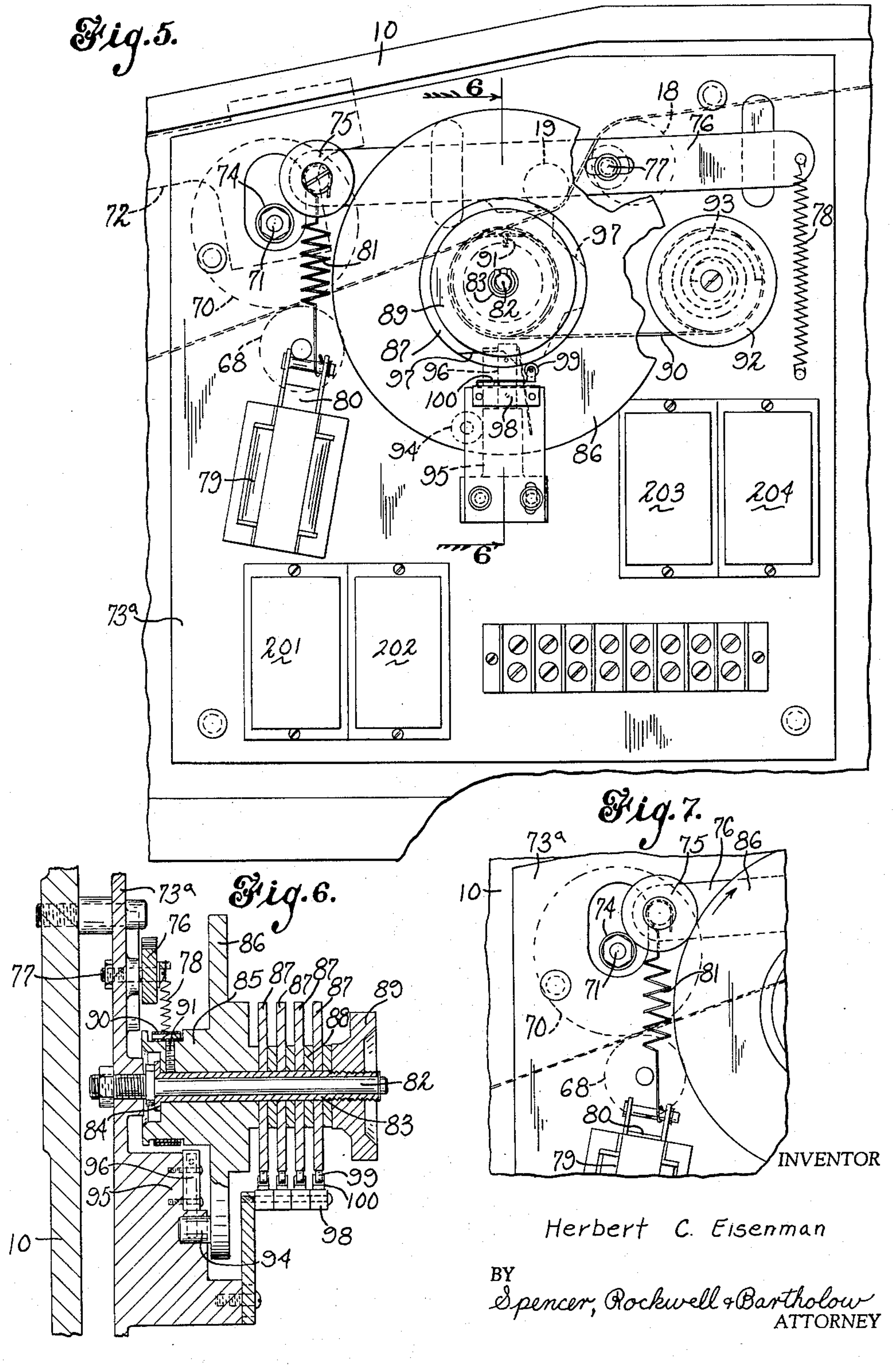
FIG. 5 is an enlarged side elevational view of a portion of the mechanism showing the tape-measuring apparatus.
FIG. 6 is a sectional view on line 6—6 of FIG. 5.
FIG. 7 is a fragmentary elevational view of certain parts shown in FIG. 5 but showing these parts in another position.
Figure 8:
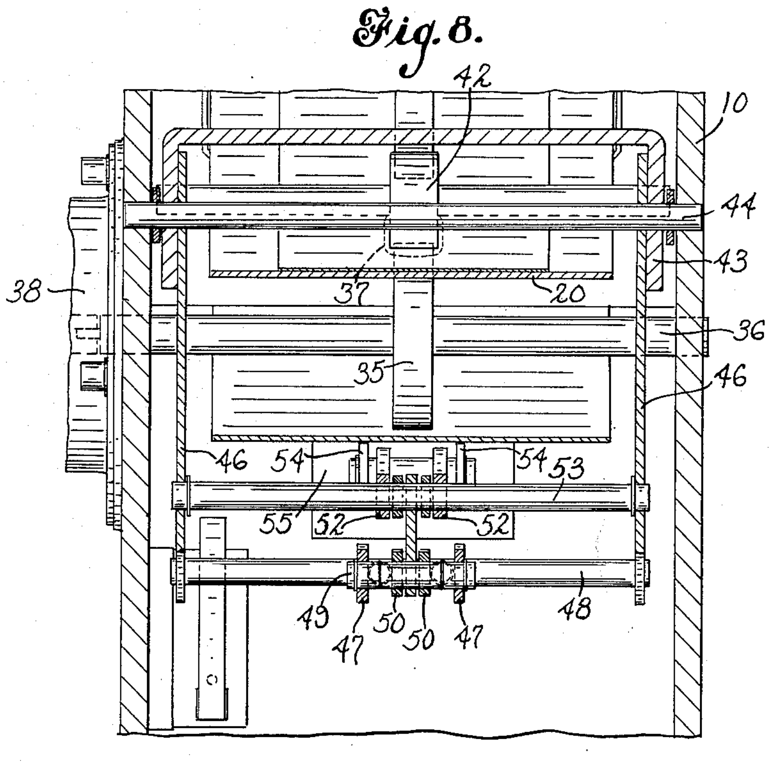
FIG. 8 is a sectional view on line 8—8 of FIG. 2.

A solenoid 79 is mounted on the plate and its armature 80 is connected by a spring 81 to the arm 76 coincidently with the axis of the roller 75 so that when the solenoid is energized, the arm 76 will be moved in a counterclockwise direction to engage the roller 75 with the driving member 74 on the shaft 71, as shown in FIG. 7. It will be understood that when the solenoid is deenergized, the spring 78 will move the arm 76 in a clockwise direction about its pivot to the position shown in FIG. 5.

Secured to the plate 73ª (FIG. 6) is a stub shaft 82 upon which is rotatably mounted a sleeve 83 having a flange 84 at its inner end. Disposed against this flange is the hub 85 of a disk 86 which is adapted to be engaged by the roller 75, as shown in FIG. 7, when this roller is drawn downwardly by the solenoid 79 so as to engage the driving member 74. Thus the driving member 74 serves to drive the disk 86 as the roller 75 engages the periphery of each of these members.

Clamped against the hub of the disk 86 are a plurality of cam disks 87, four as shown, these disks being separated by spacers 88 and clamped against the hub 85 by the nut 89 threaded upon the sleeve 83. Thus it will be seen that the sleeve 83 together with the disks 86 and 87 are rotatably mounted upon the shaft 82 which is fixed to the plate 73ª.

A flexible metallic band 90 is secured to the hub 85 by the screw 91 and, after being wound about this hub, is trained about a drum 92 (FIG. 5) rotatably mounted on the plate 73ª and urged to rotate in a counterclockwise direction by the spring 93. A stop 94 is provided upon the disk 86 and adapted to engage a projection 95 on the plate 73ª to limit movement of the disk 86 in a counterclockwise direction. At the other side of the projection 95 a switch 96 may be provided to be engaged by the stop member 94 when the disk 86 has been rotated through nearly a complete revolution in a clockwise direction, this switch serving to cut off the current to the motor 39 and stop the operation of the machine.

The disks 87 which as has been explained are rotated by rotation of the measuring roller 70 serve to stop the operation of the dispenser when a predetermined length of tape has been dispensed. Each of these disks is provided with a cam recess 97 (FIG. 5) and the disks are so set upon the sleeve 83 that these cam recesses are spaced circumferentially from each other about the axis of the cams. Cooperating with each of the disks 87 is a switch member 98 having a follower roller 99 adapted to engage the periphery of the associated disks. When the rollers ride upon the unbroken periphery of the disks, current which has been established through the driving motor will be maintained but, when one of the recesses 97 arrives opposite the follower 99, the latter under pressure of its spring 100 will move upwardly into the recess and break the current to the motor, thus stopping the feed of tape.

As shown more especially in FIG. 1, a control box 102 is provided with a plurality of push buttons marked R, 1, 2, 3 and 4 respectively. Each of these push buttons is adapted to energize the motor 39 and thus initiate operation of the machine. If the push button R is depressed, none of the switches 98 is placed in circuit with the motor and the apparatus will dispense a random length of tape, that is the feeding operation will continue until the button R is released.

When any one of the other push buttons, 1 to 4 is depressed, the circuit to the motor will be completed through one of the switches 98 and, when the corresponding cam disk 87 has been rotated to the point where the follower 99 enters the recess 97 in this disk, the circuit to the motor will be broken through the associated switch 98 and the feed stopped at that point. With the device as shown, four separate predetermined lengths of tape may be fed and automatically severed depending upon the setting of each of the cam disks 87 and the position of the recesses 97 therein.

It is contemplated that the control box 102 may be placed at a remote point if desired and means is provided for the operator at the front of the machine to energize the motor and deliver a desired length of tape from that point. Therefore, as shown in FIG. 2, a lever 103 is secured to a shaft 104 rotatably mounted on the wall of the frame 10, this member being normally urged to the position shown in FIG. 2 (the "off" position) by the spring 105. Secured to the shaft 104 is a bracket 106 adapted to engage a switch 107 and complete current to the motor. When the operator releases the lever 103, the current to the motor will be broken. This will enable the operator to deliver a strip of tape the length of which may be visually measured as will be hereinafter explained.

It will be understood that whenever the motor 39 is energized, the solenoid 51 (FIG. 2) will be energized to move the swinging frame to the position shown in FIG. 2 and engage the presser roll with the tape to initiate the feed and raise the severing member 33 to position to permit the tape to pass beneath it. Likewise whenever the motor is de-energized, the solenoid 51 will be de-energized and the solenoid 55 energized to move the frame 43 to position shown in FIG. 4, thus moving the presser roll out of engagement with the tape and effecting severing of the dispensed portion. Upon the frame 43 is provided a brake member 108 which, when the parts are in position shown in FIG. 4, will engage the measuring roll 70 and check rotation thereof.

Figure 9:
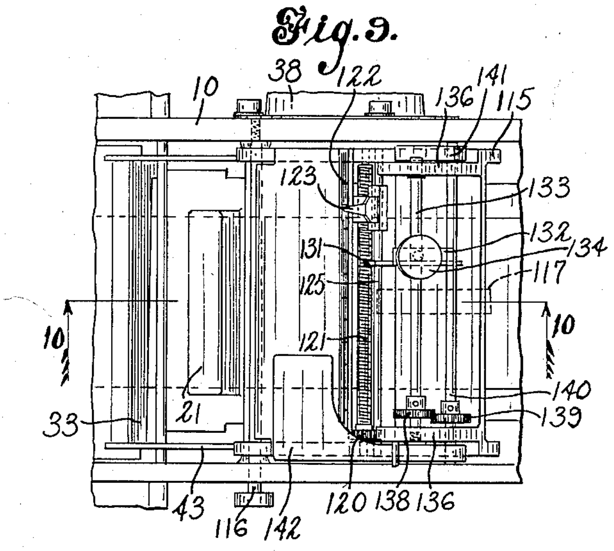
FIG. 9 is a top plan view of a modified form of the invention having provision for visual measuring of the length of a delivered strip of tape.
Figure 10:
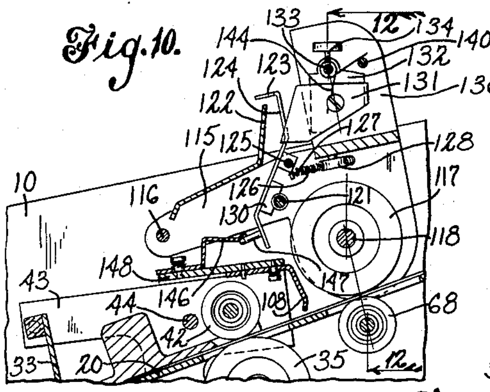
FIG. 10 is a sectional view on line 10—10 of FIG. 9.
Figure 11:
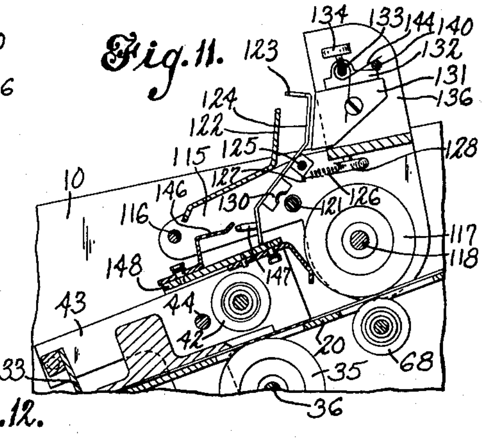
FIG. 11 is a view similar to FIG. 10 but showing the parts in another position.

If visual measuring of the dispensed tape is desired instead of the automatic measuring effected by the cam disks 87, this may be done by the apparatus shown in FIGS. 9 to 14 of the drawings. The frame 72 and measuring wheel 70 are removed from the frame and the mechanism shown in FIGS. 10 and 11 is employed in place thereof. This mechanism also comprises a U-shaped support 115 pivoted to the frame at 116 and rotatably mounting a measuring roller 117, the latter being secured to a shaft 118.

Figures 12, 13, 14:
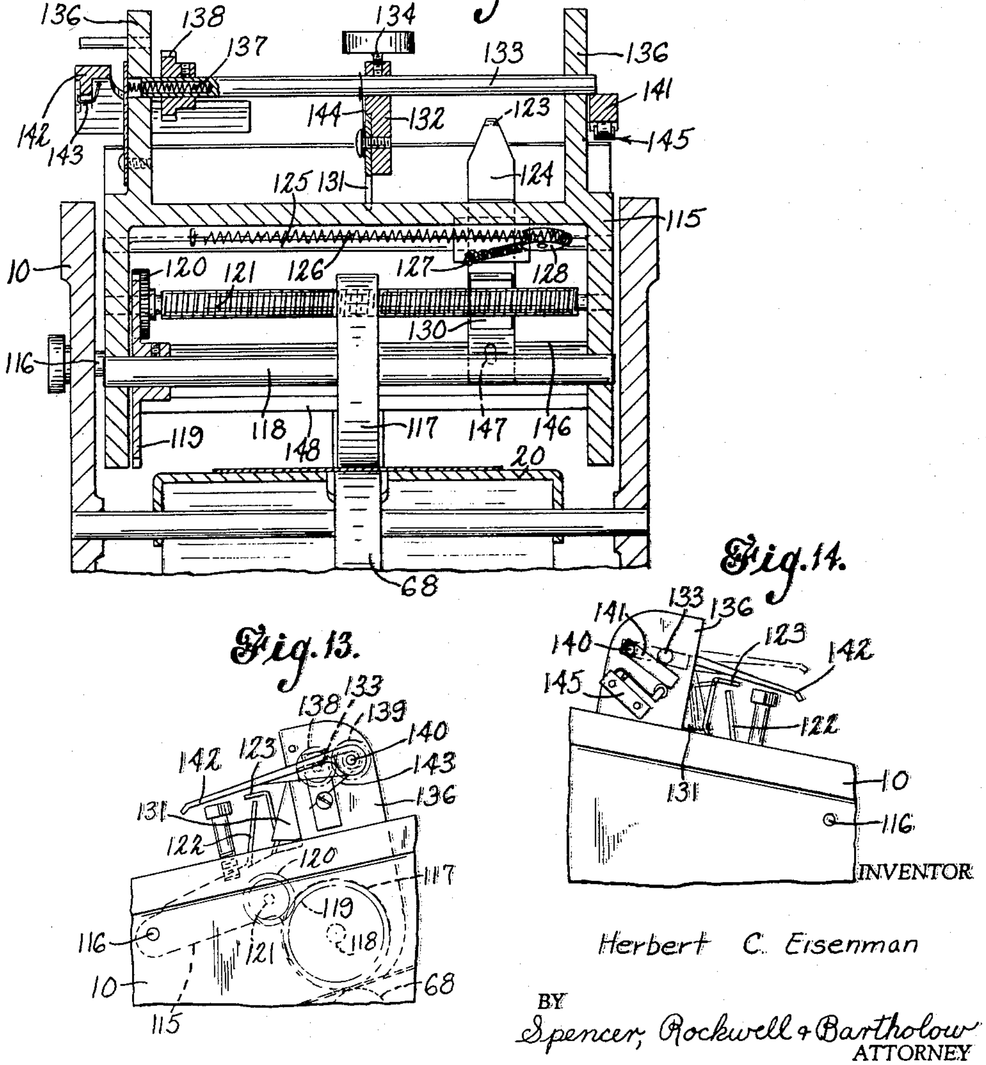
FIG. 12 is a sectional view on line 12—12 of FIG. 10.
FIG. 13 is a side elevational view of certain of the parts shown in FIG. 10.
FIG. 14 is a view similar to FIG. 13 but showing the opposite side of the structure.

As shown more especially in FIG. 12, a gear 119 is secured to this shaft which gear meshes with a pinion 120 secured to a threaded shaft 121 rotatably mounted in the support 115. Also mounted on the support 115 is a scale 122 with which cooperates a pointer 123 provided on an arm 124 pivoted on and also movable longitudinally of a shaft 125. The arm 124 is urged toward the right in FIG. 12 by a spring 126, one end of which is secured to the member 115 and the other end secured to the arm at 127 after being passed around a sheave 128 on the member 115.

The arm 124 also carries a half nut 130 adapted to engage the threaded shaft 121 so that, when the latter is rotated, the arm 124 will be moved transversely across the frame of the machine or toward the left, as shown in FIG. 12, against the tension of the spring 126. This will be the operation whenever the measuring roll 117 and its shaft 118 are rotated by engagement with the tape. The operator may, therefore, after pressing the switch arm 103 (FIG. 2) watch the progress of the pointer as it proceeds along the scale 122 and release the member 103 when the proper length has been delivered.

Also means is provided for automatically stopping the feed when the pointer 123 has reached a predetermined position on the scale. To this end a stop member 131 carried by a block 132 is adjustably secured to a shaft 133 by the screw 134 so that this stop member may be set at any position along the shaft to be engaged by the arm 124 of the pointer 123 when the latter reaches the position at which the stop member has been set.

The shaft 133 is rockably mounted in arms 136 of the supporting member 115 and also longitudinally movable therein, it being urged toward the right, as shown in FIG. 12, by the spring 137 embraced within the hollow end of the shaft. Secured to this shaft is a gear 138 which meshes with a gear 139 (FIG. 9) on a shaft 140 rockably mounted in the arms 136. Secured to one end of the shaft 140, as shown more especially in FIGS. 9 and 14, is an arm 141 which normally stands opposite the end of the shaft 133 and holds it toward the left in opposition to the spring 137.

Secured to the other end of the shaft 140 is a manually operable lever 142 by which it may be rocked. A spring 143 normally holds the lever 142 in the position shown in FIG. 13 and in the dotted-line position shown in FIG. 14 where the arm 141 stands opposite the end of the shaft 133. This is the position occupied when the device is not in operation. Also a spring 144 (FIGS. 10 and 11) tends to urge the shaft 33 in a counterclockwise direction so as to maintain the stop member 131 in a position out of contact with the arm 124. The arm 141 when depressed downwardly to its full-line position shown in FIG. 14 engages a switch 145 and closes the circuit to the motor.

When it is desired to use this mechanism to dispense the tape, the lever 142 is depressed from the dotted- to the full-line position, as shown in FIG. 14, thus moving the arm 141 away from the end of the shaft 133. This shaft is then moved to the right, as shown in FIG. 12, until its end stands over the arm 141 and holds the latter in the position shown in FIG. 14 engaging the switch 145 and closing the current to the motor 39.

When the shaft 140 has been rotated by movement of the lever 142, the shaft 133 has also been rotated by engagement of the gears 138 and 139, thus moving the stop member 131 to the position shown in FIG. 10. The engagement of the end of the shaft 133 over the arm 141, as shown in FIG. 12, will hold the parts in this position. However, when the arm 124 in its travel along the threaded shaft 121 engages the stop member 131, the shaft 133 will be moved toward the left, as shown in FIG. 12, thus releasing the arm 141 and permitting the spring 143 to move this arm upwardly and break the engagement with the switch 145, thus cutting off current to the motor and stopping the feed and, of course, at the same time de-energizing the solenoid 51 and energizing the solenoid 55 to effect the severing of the dispensed portion of the tape.

Movement of the knife frame 43 to the position shown in FIG. 11 disengages an arm 146 from a finger 147 on the arm 124 and permits the latter to swing from the position shown in FIG. 10 to the position shown in FIG. 11 so as to release the nut 130 from the screw 121 and permit the spring 126 to return the arm 124 to its starting or zero position ready for another operation. When the knife frame 43 swings downwardly to sever the tape, a plate 148 on this frame engages the lower edge of the arm 124, as shown in FIG. 11, and swings the half nut out of engagement with the threaded shaft. It will, of course, be understood that at the beginning of an operation when the motor is energized and the solenoid 51 also energized to move the knife frame 43 to the feeding position, shown in FIG. 10, the member 146 will engage the finger 147 and move the half nut 130 into engagement with the threaded shaft 121.

Figure 15:
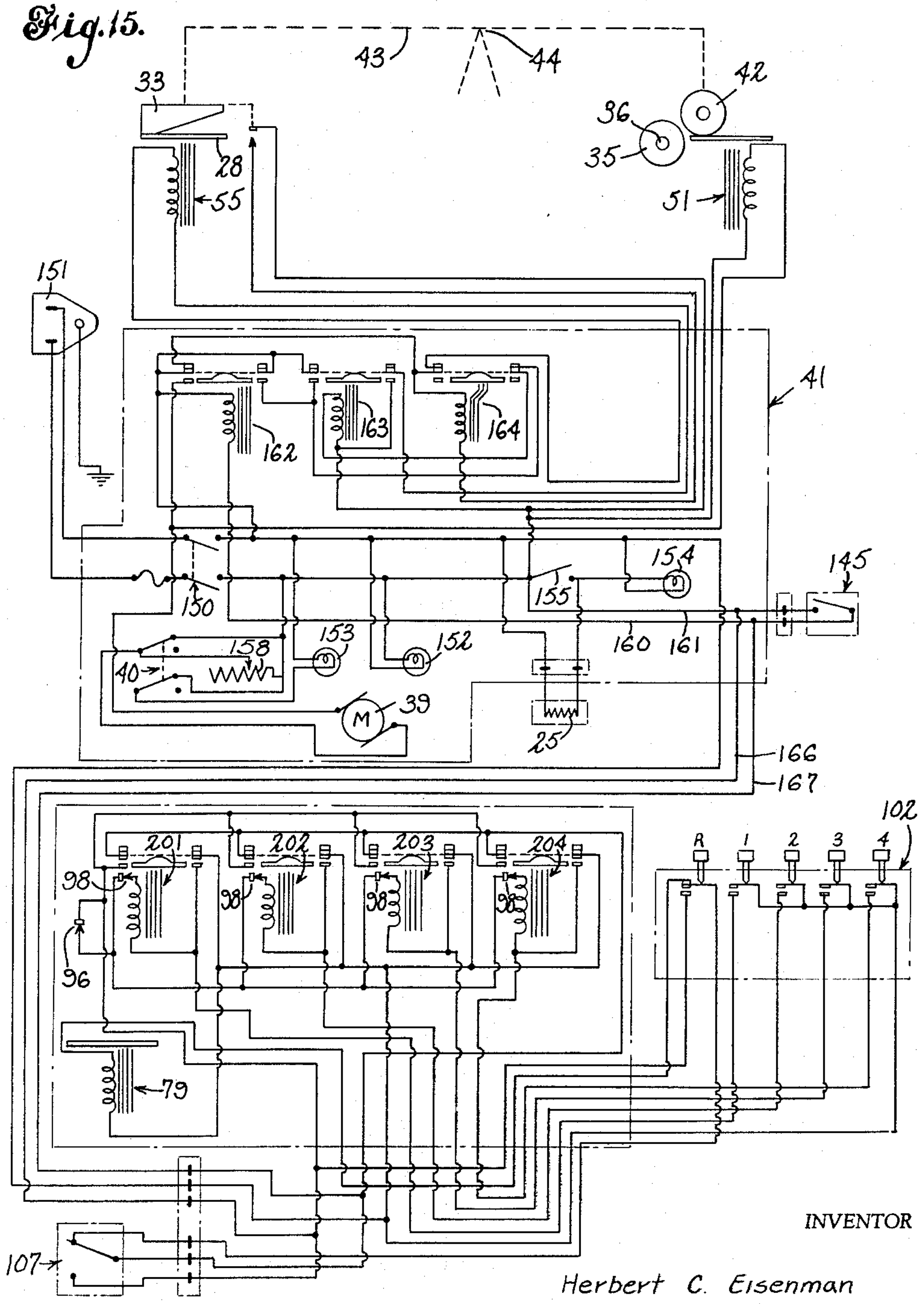
FIG. 15 is one form of wiring diagram which may be employed to operate the various electrical mechanisms of the apparatus.

In FIG. 15 of the drawings a wiring diagram is shown of the electrical connections to the various operating parts of the machine. A main switch 150 is provided, also shown on FIG. 1, which connects the device with a source of electrical current 151. It will be understood, however, that this only controls the delivery of current to the machine and does not energize the various mechanisms. A pilot light 152 (FIG. 1) is provided which shows whether or not the main switch is closed and also pilot lights 153 and 154 are provided for the motor speed switch 40 and a switch 155 which controls the delivery of current to the heating element 25. These lights will be energized when the associated switches are closed. It may be noted that, as shown in FIG. 15, the motor may be actuated at high or low speeds depending upon whether the motor is connected directly to the source of current or whether it is connected through the resistance 158, the switch 40 being operable to make either of these two connections.

If it is desired to employ the visual measuring apparatus shown in FIGS. 9 to 14, the switch 145 is closed and, as shown on FIG. 15, this closes the circuit through the wires 160 and 161 which will lead to the feeding solenoid 51 which, as shown in FIG. 2, moves the swinging frame 43 in a clockwise direction so as to move the presser roller 42 in contact with the tape. This switch also closes the circuit through the motor and starts its operation in high or low speed depending upon the position of the switch 40. The feeding of the tape will now start and continue until the arm 124 strikes the stop 131 which will effect movement of the rod 133 (FIG. 12) to the left, thus releasing the arm 141 which will be moved upward by its spring 143 and open the switch 145. The opening of switch 145 also de-energizes a relay 162 (FIG. 15) which, when released through relays 163 and 164, energizes solenoid 55 to swing the knife frame 43 in a counterclockwise direction to the position shown in FIG. 11 to effect the severing of the tape.

This completes the operation and the device is now in its normal or rest position ready for a subsequent operation. Relay 164 is of the time-delay type so as to hold the cutter in its down position for a limited time before releasing it so there will be no tendency for the knife to bounce upwardly and permit the presser roll 42 to engage the tape while it may still be spinning due to its inertia.

It will be seen that the solenoid 79 (FIGS. 5 and 15) will not be employed unless it is desired to use the automatic measuring mechanism actuated by the push buttons 1, 2, 3 and 4. If, therefore, a random length rather than one of the measured lengths is desired, this may be effected either by pressing the button R (FIGS. 1 and 15) or by manually operating the switch 107 (FIGS. 3 and 15). Actuating either of these switches disconnects the solenoid 79 from the circuit but completes a circuit through the wires 160 and 161 by way of the connections 166 and 167 which will, of course, perform the same functions as were performed with the circuit through the wires 160, 161 upon actuation of the switch 145 as previously described. In this case, however, operation of the device and feeding of tape will continue as long as these switches are held closed by the operator.

When these switches are released to permit them to open, current to the motor will be cut off as well as current to the feeding coil 51 which controls the presser roll 42 and the solenoid 55 will be energized to effect the severing of the tape. Thus either by closing the switch 107 or pressing the button R a random length of tape may be secured as the feed will continue until the switches are released.

When it is desired to deliver a measured length of tape, one of the buttons 1, 2, 3 or 4 is depressed depending upon the length of the strip desired. Closing of one of the switches operated by these buttons will energize the solenoid 79 to pull the roller 75 downwardly into engagement with the disk 86 and driving member 74. It will also, through relays to be hereinafter described, complete the circuit through the wires 160 and 161 to initiate the feeding operation as previously described and the measuring cam disks 87 will be set into rotation as these are rigidly secured to the disk 86. Also pressure of one of the push buttons will energize a corresponding one of the relays 201, 202, 203 and 204 which closes the circuit through the wires 166 and 167 and maintains this circuit closed although the push buttons may be released, until the corresponding cam disk has rotated to such a position as to receive the associated follower 99 within its recess 97 and thus break the circuit through the lines 160 and 161. It will be understood that the push buttons may be immediately released after being pressed downwardly to close the circuits, the relays holding the circuit closed after the button is released. It will also be understood that each push button only energizes one of the relays 201, 202, 203 and 204 and hence only one of the cam disks 87 will be opeartive to open the circuit to the motor and stop the tape feed.

Figure 16:
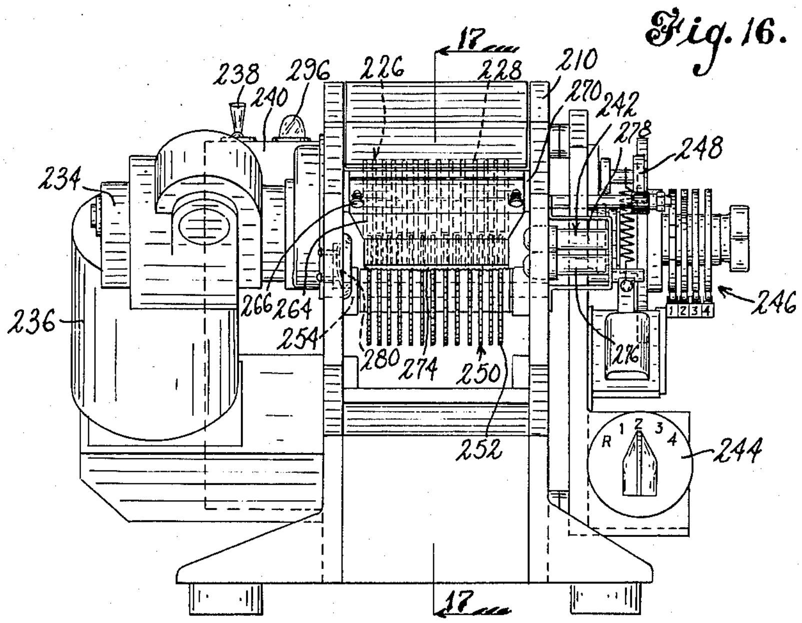
FIG. 16 is a front elevational view of another tape-dispensing machine embodying the invention in modified form.
Figures 17, 21:
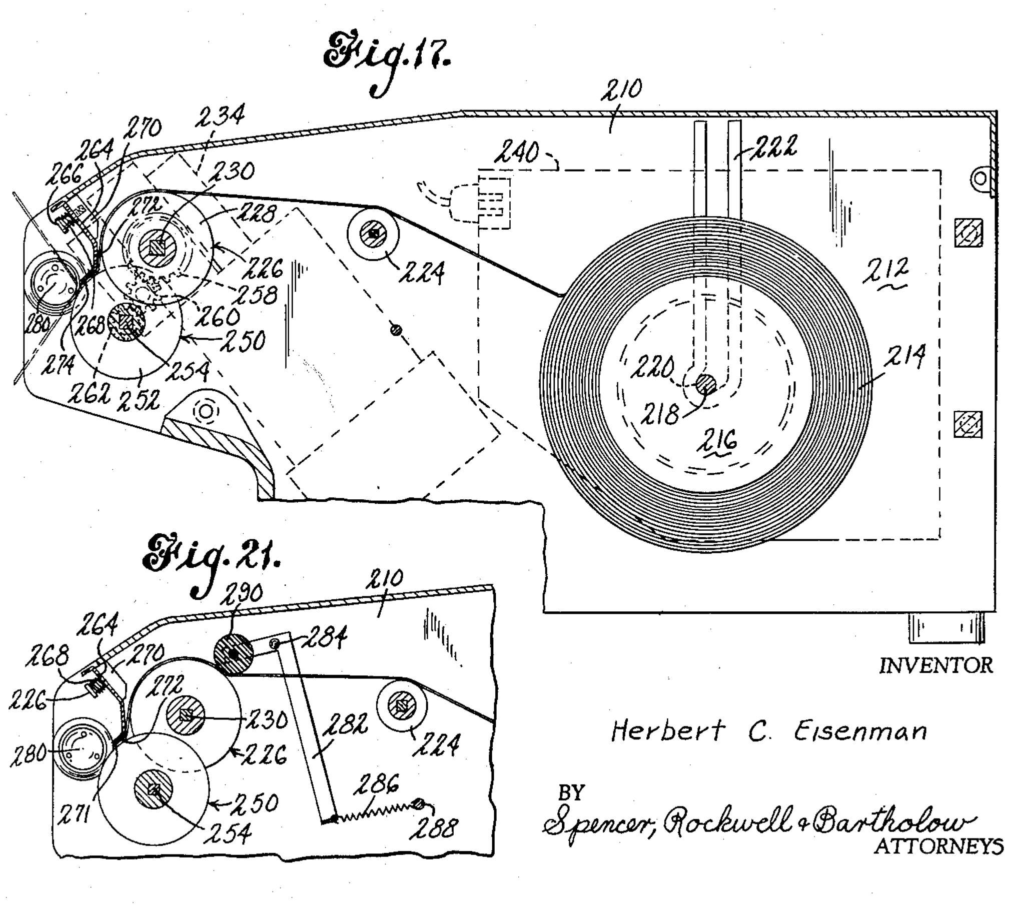
FIG. 17 is a partial sectional view on line 17—17 of FIG. 16.
FIG. 21 is a partial sectional view similar to FIG. 17 showing a modified form of the tape feeding mechanism.

To illustrate another embodiment of the invention there is shown in FIGS. 16 and 17 a tape dispensing machine, such as those employed to dispense pressure-sensitive tapes, having a housing or frame 210 and having at the rear thereof a well 212 within which may be mounted a supply roll 214 of pressure-sensitive tape which is to be dispensed. The supply roll may be of the type shown, employing a spool 216 which is preferably provided with an extension 218 on either side thereof. The extensions are supported for rotation between centers 220, formed by the configuration of rail protrusions 222 on either side of the frame.

The tape issuing from the supply roll 214 is brought around a guide roll 224 and passes around a feed roll 226 which in this instance comprises a number of disk-like members 228 mounted upon a square shaft 230. The ends of square shaft 230 are preferably enlarged and circular in form and are rotatably mounted in the frame. The shaft at one end extends through the frame into a gear box 234 which encloses reduction gearing (not shown) driven from the shaft of a motor 236 secured to the wall of the frame, the operation of the motor being controlled by the switch 238 and associated controls mounted upon a control box 240 secured to the wall of the frame so that whenever the motor is in operation, the feed roll 226 will be rotated. The motor is provided with a conventional brake to effect braking of the feed roll 226 when the motor is de-energized. The operation of the motor is controlled by the controls in the control box 240, the associated photo-electric device generally indicated at 242, rotary switching means 244, cam disk assembly 246 and cam disk assembly controller 248.

Also rotatably mounted within the frame is a stripper member 250 which, in this instance, comprises a plurality of disks 252 mounted loosely upon a non-circular shaft 254. The ends of the non-circular shaft 254 are preferably enlarged and circular in form and are rotatably mounted in the frame. As shown in FIG. 17 the disks 252 preferably extend between the disk-like members 228 so that the tape which is fed over the members 228 will be stripped therefrom by stripping disks 252. A gear 258 is provided on the shaft 230 of the feed roll 226 and this gear meshes with a pinion 260, which in turn meshes with a gear 262 upon the shaft 254 of the stripper member 250. It will be seen, therefore, that when the motor 236 is energized, both the feed roll and stripper member will be rotated. The relation of the gears 258, 260 and 262 is such that the stripper member will have a greater surface speed than the feed roll so that the tape will not cling to the stripper member but will be stripped therefrom.

In order to prevent tape of the pressure-sensitive type from curling or rolling upon itself, a flat resilient member 264 is attached to the frame 210 as shown in FIGS. 17 and 21. This resilient member is urged toward the stripper member 250 maintaining the pressure-sensitive tape in contact with the disks 252, thus preventing the tape from curling or rolling upon itself. A headed screw member 266, having an abutment or shoulder on the shank portion thereof extends through the member 264 which is in slidable relation thereto, the screw member being threaded into the frame to an extent sufficient to engage the last-named shoulder with the frame, which shoulder prevents further inward turning movement of the screw member. A compression spring 268 embraces the shank of the screw member and is interposed between the head of the last-named member and the member 264 to urge the latter toward the stripper member 250. At the end of the resilient member 264 a suitable severing knife 272 is provided which is inclined slightly forwardly, and which is preferably an integral part of the resilient member. The edge of the knife may be serrated along its edge 274 to provide an efficient severing or tearing edge as clearly shown in FIG. 18.

As more clearly shown in FIG. 18, the photo-electric device 242 comprises a transmitting portion 276, a receiving portion 278 and a reflector 280 which are mounted in close proximity to the stripper member 250 so that when the tape is elevated from the exit position to the severing position as shown in FIG. 17, the beam of light emitted from the transmitter and reflected to the receiver is broken, effecting control over the machine as will be explained hereinafter. The light beam emitted from the transmitter 276 may be scattered and dispersed and therefore the reflector 280 is preferably concave so as to reflect a thin beam of light to the receiver 278 to substantially eliminate the possibility of the tape being severed without interrupting the light beam.

Referring once again to FIG. 21, the dispenser may be provided with means for effecting greater dimensional contact between the tape and the feed roll 226, thus reducing the tendency of the tape to slip on the roll. To this end the dispenser is provided with a pivotable member 282 which rotates about a pin 284 secured to the frame. The pivotable member 282 is attached to a resilient member or spring 286 at one end, which spring is secured to the frame at 288 as shown. At the other end of the pivotable member 282 a roller 290 is provided which urges the tape against the feed roll under the pressure from the spring. The roller 290 is free to rotate about its axis and is rotated as such by the movement of the tape.

The cam disk assembly 246 is susbtantially the same as that shown and described in connection with FIG. 6 and operates to control the dispensing of measured length of pressure-sensitive tape in much the same manner. Cam disk assembly controller 248 operates in substantially the same manner as that shown in FIGS. 5 and 7 and cooperates with cam disk assembly 246 in much the same manner as the device described above in connection with FIGS. 5 and 7. To this end the guide roll 224 (FIG. 19) is provided with a driving roller 292 which cooperates with roller 75 and the associated devices. The flexible metallic band 90 is, however, secured to the hub 85 and trained about drum 92 so that the spring 93 urges the disk 86 in a clockwise direction. This is necessary since the disk 86 is rotated in a counterclockwise direction by the tape in this embodiment of the invention.

Figures 18, 19, 20:
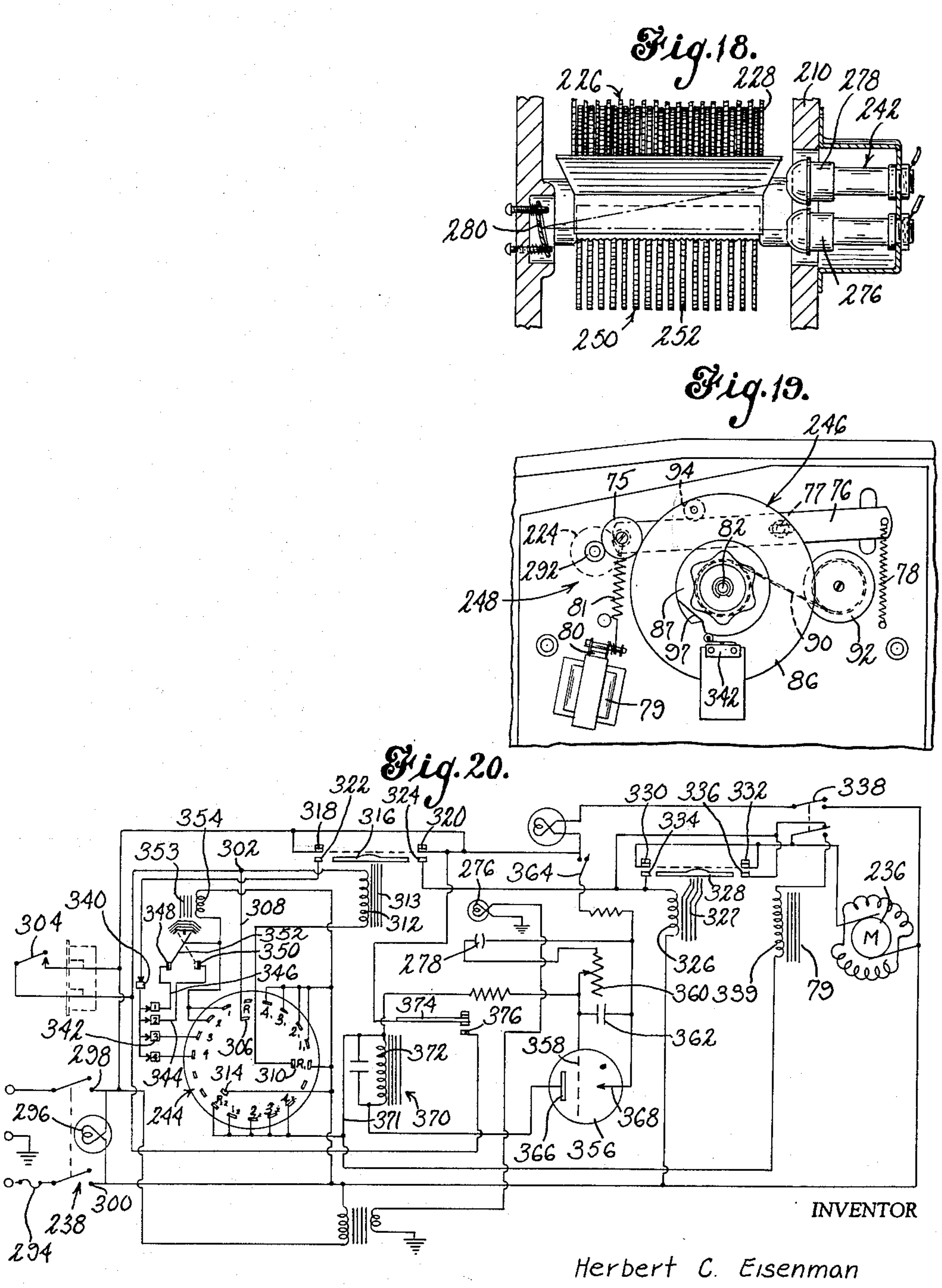
FIG. 18 is an enlarged view of a portion of FIG. 16 partially in section showing the details of the photoelectric device.
FIG. 19 is a view similar to FIG. 5 showing a modification of the mechanism.
FIG. 20 is another form of wiring diagram which is preferably employed in conjunction with the tape-dispensing machine of FIG. 16.

In FIG. 20 of the drawings a modified wiring diagram is shown which may be used with either of the tape dispensing machines described above. A main switch 238 (FIG. 16) is provided which connects the device with a source of electrical current which is appropriately fused at 294 as shown. This switch, however, merely controls the delivery of current to the machine and does not energize the various controls and mechanisms. A pilot light 296 (FIG. 1) is provided which indicates whether or not terminals 298 and 300 are energized.

As shown, terminal 298 is connected to a junction 302 by way of a foot switch or the like 304. The junction 302 is connected to a stationary terminal 306 in the rotary switching means 244 by way of line 308. Junction 302 is also connected to a stationary terminal 310 by way of a coil 312 in relay 313.

For purposes of clarity the rotary switching means 244 is shown to comprise a series of rotatable contacts R, 1, 2, 3 and 4 in three distinct sets which contact and cooperate with stationary terminals 306, 310 and 314. Electrical contact is indicated between the rotatable contacts and the stationary terminals when the respective elements lie opposite one another. Therefore when random length feeding is desired, contacts R, $R_1$ and $R_2$ make contact with stationary terminals 306, 310 and 314 as shown. When specific lengths of tape are to be fed, the rotary contacts are moved clockwise and the stationary terminals 306, 310 and 314 contact the respective rotatable contacts in each set.

Terminal 310 is therefore connected through a rotatable contact in the $R_1$ set to terminal 300, and when the main switch 238 and the foot switch 304 are closed, coil 312 in relay 313 is energized. An armature 316 is actuated by the current passing through the relay coil 312 which moves contacts 318 and 320 carried by the armature into engagement with contacts 322 and 324 respectively. This then energizes the motor M and a coil 326 in a time delay relay 327 and an armature 328 is actuated by the current passing through coil 326 which moves contacts 330 and 332 into engagement with contacts 334 and 336 respectively. When random lengths of tape are to be fed by the machine, which lengths are controlled by the duration of time the foot switch 304 is held in a closed position, a control switch 338 is in the position shown in FIG. 20. When switch 338 is in the position shown, coil 339 in solenoid 79 remains disconnected from the circuit so that the roller 75 is kept out of contact with the driving roller 292. When the motor M is energized as previously indicated, the operation of the motor continues until the foot switch 304 is opened thus de-energizing coil 312, opening the relay 313 and breaking the contacts 320 and 324.

When the switch 304 is employed and measured lengths are to be fed by the machine, switch 338 is closed so that when contacts 320 and 324 are engaged, coil 339 is energized as well as coil 326 and the motor M. This causes the roller 75 to engage driving roller 292 thereby bringing about rotation of disk 86 and the cam disks 87. Rotary switch 244 has been previously positioned so that stationary terminals 306, 310 and 314 are in contact with rotatable contacts 1, 2, 3 or 4 in each set of rotatable contacts so that when contacts 318 and 322 are engaged by momentarily closing switch 304, the armature 316 is held in position by the current passing from terminal 298 through contacts 318 and 322, a safety switch 340 whose contacts are normally closed, through one of the cam actuated switches, generally indicated at 342, through the rotary switching means 244, line 308, coil 312 back through the rotary switching means 244 to terminal 300. When the selected cam actuated switch 342 opens under the control of the associated cam disk 87, the coil 312 is de-energized, breaking the engagement between terminals 320 and 324 and de-energizing the motor M and coils 326 and 339. The disk 86 is then rotated to its original position under action by the flexible metallic band 90 and the machine is ready to be triggered again by the foot switch for dispensing another piece of tape after the dispensed tape is torn away.

In some applications it is desirable to deliver alternate lengths of measured tape and in this connection I have included in the circuit of FIG. 20 the necessary elements to obtain up to two alternate lengths. By way of example, when the rotatable contacts 1 or 2 are in contact with the stationary terminals the machine can deliver alternate lengths of measured tape, one length corresponding to length 1 and the other length corresponding to length 2. This is accomplished by diverting the connections from the corresponding cam actuated switches through lines 344 and 346 which are connected to terminals 348 and 350. One of these terminals will make contact with a flip-flop armature 352 in a relay 353. This armature moves from the full line position to the dotted line position when a coil 354 in the relay is energized, thus overriding the selection of rotary switching means and putting cam actuated switch 1 or 2 in the circuit accordingly. To obtain three or four alternate lengths the flip-flop armature relay 353 may be replaced with a suitable stopping relay.

In some applications, it is desirous of automatically feeding the next length of tape from the machine as soon as the preceding measured length of tape is severed. In this connection the photoelectric device 242 may be employed along with its associated circuitry. The associated circuitry preferably employs a thyratron 356 whose grid 358 is self biased in the usual manner through a resistor 360 and a capacitor 362. The resistor 360 is a variable resistor so that it can be used to adjust the potential level of the grid as the tube characteristics change with age. By closing a switch 364, power is applied to the thyratron across the plate 366 and the cathode 368 of the thyratron. Tracing the circuit from the current source, terminal 298 is connected to cathode 368 through the switch 364. Terminal 300 is connected to a load 370 in the plate circuit of the thyratron by way of stationary terminal 314 in the rotary switching means 244, which terminal engages one of the rotatable contacts 1, 2, 3 or 4 in the $R_2$ set. These rotatable contacts in the $R_2$ set are in turn connected to the load 370 by way of line 371.

In operation, the thyratron is biased so that when the beam of light, emitted from the transmitter 276 and reflected to the receiver 278, is broken, the grid bias is reduced to a point where it becomes more positive and the thyratron fires, thus passing a current through the load 370. The current through a coil 372 in the load, actuates an armature 374 which connects terminal 298 to coil 312 through a contact 376 and junction 302, as shown. As previously mentioned, coil 312 is connected to rotatable contact 1, 2, 3 or 4 in the $R_1$ set by way of stationary terminal 310. Rotatable contacts 1, 2, 3 and 4 are connected by a common line to terminal 300 thus energizing coil 312 and activating the armature 316. The coil 326 and the motor M are energized accordingly and with the switch 338 in the closed position the coil 339 is energized and the machine controlled as previously described. The movement of the armature 328 upon energization of coil 326 in time delay relay 327 is delayed so that when the beam from the transmitter is interrupted causing the thyratron to fire, thus energizing the coil 312, etc., a sufficient amount of time is allowed to effect the severing of the previously dispensed strip of tape before the motor M is energized.

The switch 340 is similar to switch 96 described above in connection with FIGS. 5 and 6 and performs the same function. This switch is normally closed and is designed to open, de-energizing all of the cam operated switches 342 when contacted by the stop 94. This provides some measure of protection for the cam disk assembly in case the operator closes switch 338 but effects the feeding of tape in random lengths.

While I have shown and described several embodiments of my invention, it is to be understood that it is not to be limited to all of the details shown, but is to include all modifications and variations which come within the scope of the appended claims.

What is claimed is:

1. A tape dispenser comprising a frame, a first feed roll mounted thereon for rotatable movement, an electric motor for driving said first feed roll, a second feed roll rotatably and swingably mounted on said frame for movement toward and from a feeding position in which said first and second feed rolls cooperate to feed a tape strip, first electrical means for effecting relative movement of said second feed roll to the feeding position and to initiate a tape-feeding operation upon energization thereof, a measuring element independent of said feed rolls and adapted to engage the moving tape and be moved thereby, a controlling mechanism drivable by said measuring element, means responsive to a predetermined movement of said controlling mechanism to de-energize said first electrical means, a severing blade swingably mounted to said frame and cooperatively connected to said second feed roll, second electrical means for effecting relative movement of said second feed roll to a non-feeding position and concurrently effect movement of said severing blade to a tape-severing position, and means for energizing said second electrical means in response to the de-energization of said first electrical means.

2. The structure defined in claim 1 wherein said controlling mechanism comprises a plurality of controlled devices, and further including means for selecting one of said controlled devices and render it operative in response to said measuring element for de-energizing said first electrical means after a predetermined movement of said selected controlled device.

3. A tape dispenser comprising a main frame, a pair of cooperating feed rolls rotatably mounted on the main frame, an electric motor for driving one of said rolls, a swinging frame on which the other of said rolls is supported for movement relative to said one of said rolls between a feeding and non-feeding position, a severing member on said swinging frame moved to sever the tape when said other roll is moved to said non-feeding position, a feeding solenoid to move said swinging frame to place the other of said rolls in said feeding position, a second solenoid to move said swinging frame to the non-feeding and severing position, a measuring roller adapted to engage the tape and be rotated thereby, a plurality of cam elements rotatably mounted on the main frame and connectable to said measuring roller for rotation thereby, a plurality of switches, each of said switches being adapted to be actuated by a different one of said cam elements, manually operable means for selecting one of said switches, electrically actuatable means, an electrical circuit including said electric motor, feeding solenoid, said actuatable means and at least one of said switches, means responsive to operation of said manually operable means to actuate said electrically actuatable means to close said circuit and thereby energize said electric motor, feeding solenoid, and drivingly connect said measuring roller and said cam elements, and means responsive to actuation of the selected switch by its associated cam element to deenergize said circuit and energize said second solenoid whereby said second solenoid moves the other of said rolls to a non-feeding position and causes said severing means to sever the tape.

4. A tape dispenser for dispensing a predetermined length of tape comprising a main frame, means on said main frame adapted to support a supply of tape, a driven feed roll, an electric motor for driving said feed roll, a swinging frame pivotally mounted on said main frame, said swinging frame rotatably supporting a presser roll, electrically actuated means operative for moving said swinging frame to place said presser roll in engagement with the tape and to place a said tape in feeding engagement with said feed roll, a tape measuring mechanism supported by said main frame for interrupting the feed of tape after a predetermined amount has been dispensed, said measuring mechanism including a pivoted frame supported by said main frame, an independent measuring roll rotatably supported by said pivoted frame and adapted to engage the tape and be rotated thereby, a rotatable shaft, means affording a driving connection between said measuring roll and said rotatable shaft, relay means, switch means connected in circuit relation with said motor, said relay means and said electrically actuated means for opening the circuit and interrupting the operation of said electrically actuated means to discontinue feed of the tape, means movable from a starting position upon rotation of said shaft to operate said switch means, means for returning said movable means to a starting position upon operation of said switch means, a plurality of manually operable means for the selection of predetermined lengths of tape and for actuating said relay means to energize the circuit including said electric motor, electrically actuated means, means affording a driving connection and switch means to feed said tape until operation of said switch means upon dispensing movement of a predetermined length of tape.

References Cited by the Examiner

UNITED STATES PATENTS

| | | | |
|---|---|---|---|
| 1,515,289 | 11/24 | Tullis | 33—132 |
| 2,325,054 | 7/43 | Helsel | 83—243 |
| 2,408,363 | 10/46 | Beckman et al. | 83—243 |
| 2,538,972 | 1/51 | Magnani | 83—369 |
| 2,650,822 | 9/53 | Wyza | 33—132 |
| 2,785,748 | 3/57 | Von Stoeser et al. | 83—243 |
| 2,971,416 | 2/61 | Von Stoeser | 83—243 |
| 3,029,355 | 4/62 | Kruger | 83—241 |

ANDREW JUHASZ, *Primary Examiner.*

HUNTER C. BOURNE, Jr., CARL W. TOMLIN, *Examiners.*